UNITED STATES PATENT OFFICE 2,541,977

FLATTING AGENT AND METHOD FOR THE PRODUCTION THEREOF

Kenneth A. Earhart, Union, N. J., assignor to U. S. Industrial Chemicals, Inc., Newark, N. J., a corporation of Delaware No Drawing. Application June 4, 1947, Serial No. 752,561

11 Claims. (Cl. 106—173)

This invention relates to a flatting agent, to a method for the production thereof, and to a coating composition containing the same.

While many coating compositions dry to yield a glossy surface when applied thereto, a large proportion of the coating compositions used is required to have a dull or rubbed effect in order to possess a pleasing appearance as well as to have utility.

Flat finishes may be obtained by incorporating into coating compositions large amounts of pigments, such as diatomaceous earth, clay, magnesia, etc., in order to reduce the specular reflection by the films resulting therefrom. The coating compositions containing pigments, however, are prone to become brittle upon drying, because large amounts of these pigments must be incorporated in order to obtain the required reduction of gloss. Furthermore, such coating compositions containing pigments possess an excessive tendency to settle, which may be somewhat controlled by the use of metallic soaps, such as aluminum or zinc stearate. However, when such soaps are employed, the adhesion and hardness of the film are sacrificed.

Certain natural resins, such as Batu, may also be incorporated as flatting agents into casing compositions, as has been described by Mantell, Kopf, Curtis and Rogers on page 301 of their book entitled "Technology of Natural Resins" (1942). However, natural resins, when so used, have undesirable characteristics in that they lack uniformity in flatting effectiveness, produce flat varnishes which increase in gloss on ageing in the container, yield films having increased gloss at increased baking temperatures, and yield films of low flexibility.

To avoid the use as flatting agents of pigments, fatty acid soaps, and natural resins, with their attendant disadvantages, there may be substituted the aluminum or zinc salts of rosins which have been modified with phenolic resins. These materials suffer, however, from the yellowing qualities imparted by the phenolic resins, and their solubility in various organic solvents is not sufficiently low to enable them properly to be classed as inert. Hence, due to the swelling action of the solvents in the coating compositions containing such salts, there takes place a notable increase in the viscosity of the coating composition upon standing (sometimes gelation occurs), together with a variation in the flatting effect. As a result, such rosin salts are not satisfactory flatting agents. The aluminum or zinc salts of the rosin-maleic anhydride addition products may also be employed as flatting agents. However, such salts are too soluble in organic solvents, so that they are not ideally suited as flatting agents, even though yellowing is reduced as compared to salts of phenolic-modified rosins.

The foregoing being briefly the state of the art, it is therefore an object of this invention to provide a flatting agent which when added to a coating composition yields a product which is stable when stored.

It is a further object of this invention to provide a flatting agent which retains its initial color and does not darken when exposed in thin films in coating compositions.

It is also an object of this invention to provide a flatting agent which is stable when baked in a film at a temperature of about 250° F.

It is an added object of this invention to provide a method for the preparation of a flatting agent having the aforementioned and other advantageous properties.

The foregoing and other objects are accomplished in accordance with this invention by preparing certain metallic salts of a Congo resin. The salts are prepared in accordance with the method of this invention by first preparing an aqueous alkali metal hydroxide solution, dispersing therein a Congo resin, and then precipitating the resin under conditions of vigorous agitation by the addition of a water-soluble salt of a metal selected from the group consisting of aluminum, magnesium, calcium, strontium, barium, zinc and zirconium.

The following examples, which are to be considered not limitative, illustrate in detail the method for the preparation of the flatting agent of this invention.

Example I 3.8 gms. of sodium hydroxide pellets was dissolved in 350 ml. of water, and the temperature of the solution was raised to 70° C. 50 gms. of powdered Congo (powdered so that 100% passed through a 100-mesh per linear inch U. S. Standard sieve) was slowly added to this warm solution with constant and vigorous agitation. Care was exercised that the temperature of the dispersion did not rise substantially above 70° C. After all the Congo had been added and the saponification had proceeded for several minutes, the temperature was then slowly raised to 95-100° C. in order to increase the rate and extent of the saponification. No agglomeration of the Congo particles took place at these increased temperatures. After keeping the reaction mixture at 95-100° C. for about 15 minutes, 400 ml. of water was added in order to reduce the viscosity of the dispersion. 10.8 gms. of $Al_2(SO_4)_3 \cdot 18H_2O$ (an amount sufficient to neutralize all the caustic soda used for the saponification) dissolved in water was slowly added to the slurry while the latter was being violently agitated, the agitation being necessary because as the precipitation proceeded the consistency of the slurry increased very noticeably. At frequent intervals the pH of the agitated slurry was determined, and when the pH was between four and five the addition of the aluminum sulphate solution was discontinued. The complete batch was held at 95° C. for 10–15 minutes, and was then allowed to cool. The precipitate was thereafter separated, washed free of salts, and dried at a temperature of 50° C. The dried material was a useful flatting agent in varnishes and lacquers.

*Example II*

1,000 gms. of raw, crushed Congo gum (average particle size about one-fourth inch) and 1,500 gms. of solvent (prepared by adding two volumes of methyl alcohol, one volume of ethyl acetate and one volume of aviation gasoline to 100 volumes of a mixture containing 95.2 volumes of 190-proof ethyl alcohol and 4.8 volumes of methyl alcohol) were charged into a five-liter flask. The flask was then heated on a water-bath to reflux temperature, and the charge was agitated as completely as possible in view of the sticky, spongy nature of the warm, solvent-swollen Congo. After 30 minutes of refluxing, the solution was separated from the unextracted Congo, and 1,000 gms. of fresh solvent was added. The mixture was then refluxed as before, and the unextracted Congo was again separated from the solvent. The extraction process was again repeated with a third charge of 1,000 gms. of fresh solvent. After this third extraction, the material remaining in the flask was considered to be the unextractable portion of the Congo gum, and amounted to about 70% of the total original charge thereof. This unextracted material was separated, dried, and then powdered in a ball mill until 100% passed through a 100-mesh screen.

10 gms. of sodium hydroxide was dissolved in 700 gms. of water. The solution was heated to 70° C., and 100 gms. of the powdered, unextractable Congo added thereto. The mixture was held at this temperature with constant agitation until the major portion of the gum had dispersed. The mixture was then heated to 95° C. and held at that temperature with mixing until the gum was dispersed completely. The mixture was thereafter diluted with 800 gms. of water and again heated to 95° C. To the vigorously agitated Congo salt solution, there was slowly added a solution of 30 gms. of $Al_2(SO_4)_3.18H_2O$ in 75 gms. of water until the pH of the mixture was between four and five. Accompanying the transition of the mixture from alkaline to acid conditions, it was noticed that the thin slurry thickened and then again became thin. The precipitate was washed free of water-soluble salts and dried at a temperature of 50° C. The dried material was a useful flatting agent in varnishes and lacquers.

Example III which follows illustrates the preparation of a flatting agent using the solvent-soluble portion of raw Congo obtained by evaporating the solvent used in the extractions of Example II.

*Example III*

10 gms. of sodium hydroxide was dissolved in 700 gms. of water, after which the solution was heated to 70° C. To the heated solution there was then slowly added 100 gms. of the crushed extracted Congo having an average particle size of about three-sixteenths inch. The reaction mixture was maintained at that temperature with constant and vigorous agitation until the major portion of the Congo had dissolved, after which the mixture was heated to 95° C. and held at that temperature until the resin was completely and uniformly dispersed in the mixture. 800 gms. of water was thereafter added and the mixture again heated to 95° C. Continuing the agitation, there was then slowly added to the Congo salt solution a solution containing 30 gms. of $Al_2(SO_4)_3.18H_2O$ in 75 gms. of water until the pH value was between four and five. Accompanying the transition of the mixture from alkaline to acid conditions, it was noted that the thin slurry thickened and then again became thin. The precipitate was washed until free of water-soluble salts, and then dried at a temperature of about 60° C. The precipitate was a useful flatting agent for use in varnish and lacquer compositions.

*Example IV*

15.2 gms. of sodium hydroxide pellets was dissolved in 1400 ml. of water, after which the temperature of the solution was raised to 70° C. 200 gms. of powdered Congo (having an average particle size of 10 microns and prepared by a process utilizing impact and attrition between particles in a curved tube in which the particles were driven around by energy in the form of compressed air) was slowly added to the warm solution with constant and vigorous stirring. Care was exercised that the temperature of the dispersion did not rise substantially above 70° C. After all the Congo had been added and the saponification had proceeded for several minutes, the temperature of the mixture was then slowly raised to 95–100° C. After keeping the reaction mixture at 95–100° C. for about 15 minutes, the batch was diluted with 1600 gms. of water and there was then added with vigorous stirring a solution of 40 gms. of $Al_2(SO_4)_3.18H_2O$ in 100 gms. of water until the pH of the agitated slurry was between four and five. The complete batch was then held at 95° C. for 10–15 minutes, then cooled, and the precipitate separated. The precipitate was then washed free of salts, and dried at a temperature of 50° C. The dried material was a useful flatting agent in varnishes and lacquers.

Examples V through VII which follow illustrate the preparation of organo-metallic flatting agents containing metals other than aluminum.

*Example V*

|  | Grams |
|---|---|
| (1) Powdered Congo | 100 |
| (2) NaOH | 7.6 |
| (3) Water | 375 |
| (4) Water | 325 |
| (5) Water | 800 |
| (6) $Ca(C_2H_3O_2)_2.H_2O$ | 17.6 |
| (7) Water | 100.0 |

*Example VI*

|  | Grams |
|---|---|
| (1) Powdered Congo | 100 |
| (2) NaOH | 7.6 |
| (3) Water | 375 |
| (4) Water | 325 |
| (5) Water | 800 |
| (6) $Zn(C_2H_3O_2)_2.2H_2O$ | 18.3 |
| (7) Water | 150.0 |

Example VII

| | Grams |
|---|---|
| (1) Powdered Congo | 100 |
| (2) NaOH | 7.6 |
| (3) Water | 375 |
| (4) Water | 325 |
| (5) Water | 800 |
| (6) $Zr(NO_3)_4 \cdot XH_2O$ | 22.5 |
| (7) Water | 100 |

The quantity of zirconium nitrate given here was sufficient in this particular experiment, but will vary somewhat, depending upon the water content of the zirconium nitrate employed. The quantity of zirconium salt used should be sufficient to lower the pH of the mixture containing the saponified Congo to less than five.

Procedure for Examples V–VII

A solution of sodium hydroxide (2) in water (3) was prepared. To this solution at room temperature was added the powdered Congo resin (1), which was so finely divided that 100% passed through a 100-mesh screen. The mixture was then agitated vigorously for about 15 minutes, during which time its appearance changed from a thin, lumpy slurry to a viscous, smooth paste. To the vigorously agitated paste there was then added the additional water (4) in small increments. The object of this procedure was to obtain a uniform dispersion of the gum in the caustic solution, prior to heating the solution to a temperature at which the undispersed gum would congeal to undispersable agglomerates. The mixture was then heated to 95° C. and held there for about 15 minutes to complete the reaction between the sodium hydroxide and the powdered Congo, after which additional water (5) was added. The mixture was then again heated to 95° C., and the solution of the soluble metallic salt (6) in water (7) was added slowly. When the addition of the water solution of the metallic salt was about complete, it was noted that the slurry, which had until then been thin in consistency, thickened momentarily to a heavy consistency and then, without further addition of the solution containing the salt, thinned out once more. The entire procedure up to this point was carried out under vigorous agitation. Finally, the precipitate was washed until free of water-soluble salts, and then dried at 60° C. to yield a product which was a useful flatting agent in varnishes and particularly in lacquers.

The products of Examples V–VII resemble each other quite closely and are effective flatting agents, although a somewhat higher concentration of these products in a coating composition is required than is required of the corresponding aluminum product, in order to achieve the same degree of flatness in a coated surface.

The foregoing examples illustrate the preparation of the flatting agent of the present invention by agitating vigorously a heated aqueous medium containing a Congo resin and an alkali metal hydroxide (for example, sodium hydroxide, potassium hydroxide and lithium hydroxide) for a period of time sufficient to complete the saponification of the resin and thereafter with vigorous agitation precipitating the resin as a water-insoluble salt by the addition to the stirred mixture of a water-soluble salt of aluminum, magnesium, calcium, strontium, barium, zinc and zirconium.

The flatting agent of this invention may be prepared from any fossil, semi-fossil or semi-recent resin of the Congo type having a direct acid number above about 60. As examples I, II and IV–VII show, when raw Congo or that portion of Congo which is insoluble in alcohol, acetone, methyl ethyl ketone, etc. is employed in the preparation of the flatting agent, the resin should be so finely divided that substantially 100% of it will pass through a screen containing 100 holes per linear inch. With larger sizes of the raw Congo or the solvent-insoluble portions of Congo, there results a poor saponification, which results in a generally inferior product in that it possesses less flatting-power and is difficult to grind and incorporate into a vehicle. On the other hand, when the alcohol, acetone, methyl ethyl ketone, etc.—extractable portion of Congo and the remaining resins of the Congo type are used, the size of the pieces of resin employed as a reactant is not critical. However, in order that the saponification may proceed at a desirable rate when such solvent-extractable portions of Congo or other resins of the Congo type, are employed, it is desirable that the particle size of the resin utilized be less than about ½ inch in diameter.

Furthermore, in order that the reaction may proceed rapidly, it is preferable that the saponification of the resin with the alkali metal hydroxide be effected at a temperature above about 50° C., although temperatures as low as room temperature may be used. Care should also be exercised, however, that the temperature at which the initial saponification is effected is not too high (e. g., above 100° C.), higher temperatures giving rise to excessive aggregation of the particles of resin. In fact, when raw or the solvent-insoluble portion of Congo is used, it is advisable to maintain the saponification temperature below about 80° C. during the initial saponification of the resin (see Examples I, II and IV–VII), in order to prevent the softening of the resin and the formation of lumps. However, after the raw or solvent-insoluble portion of Congo has been partially saponified, the saponification temperature may be raised with no deleterious effects, as the aforementioned examples indicate.

Any water-soluble salt of aluminum, magnesium, calcium, barium, strontium, zinc and zirconium may be used for reaction with the Congo-alkali metal soap. Among such salts are calcium chloride, calcium nitrate, calcium acetate, aluminum chloride, aluminum nitrate, basic aluminum acetate, zinc chloride, zinc nitrate, barium chloride, barium nitrate, barium acetate, strontium chloride, strontium nitrate, magnesium chloride, magnesium sulfate, zirconium sulfate, zirconium nitrate, zirconyl chloride, etc.

After the flatting agent is formed by the reaction of the alkali-metal salt of the Congo resin and the water-soluble salt of the desired metal, the product may be recovered in a pure and useful form by washing it until substantially free of water-soluble salts, followed by a drying of the washed material. The drying of the final product is preferably carried out at a temperature below about 80° C., because above this temperature the particles may coalesce with a resulting decrease in the flatting power of the product and also a darkening of the films formed from the composition into which it is incorporated. However, once the final product has been dispersed in a varnish or lacquer vehicle and applied as a film, the film may then be force-dried at temperatures of about 250° F. with very little loss in flatting efficiency and no increased yellowing due to the presence of the flatting agent.

In incorporating the flatting agent into a varnish or alkyd coating composition, the flatting agent should first be ground with low-solvency petroleum thinners to form a paste. This is effected by combining, for example, 25 parts by weight of flatting agent with 75 parts by weight of mineral spirits (boiling range 150–207° C., aniline point 50° C.), and thereafter grinding the mixture in a ball mill for 16–24 hours. The resulting paste is smooth and buttery, and can be incorporated into a clear or pigmented varnish or alkyd vehicle by simple stirring. Depending upon the varnish or vehicle employed and the flatting desired, up to about 40% by weight of flatting agent, based upon the content of total non-volatiles in the composition, may be used. Preferably, the flatting agent will comprise 15–30% of the vehicle, based upon the non-volatile content thereof.

When the flatting agent of the present invention is incorporated into flat varnish compositions thinned with mineral spirits, the flatting agent may have a tendency to settle out. It is possible, however, to cause the flatting agent to be permanently suspended in the composition by the addition thereto of small amounts of highly polar solvents, such as normal butyl alcohol and the monobutyl ether of ethylene glycol. These solvents should be added to the composition after grinding the flatting agent into a paste and prior to the final let-down thereof with the varnish or alkyd composition. Xylol-thinned flat alkyd coating compositions containing the flatting agents of this invention do not possess this settling property, due to the large amount of the xylol present, and in the case of such compositions no solvent precautions are necessary.

As a further example of the first method of incorporating the flatting agent into the vehicle, there may be prepared by grinding in a pebble mill for 16–24 hours a composition containing 25% of the flatting agent, 60% of mineral spirits and 15% of n-butanol. This paste may be let down simply by stirring 40 parts of it into a 10–20 gallon oil length varnish containing 50% of non-volatiles or by stirring 46 parts of it into 54 parts of a 25 gallon oil length varnish containing 50% of non-volatiles.

As a more specific example of the preferred method of incorporating the flatting agent into a varnish when a petroleum thinner of low-solvency power is used in preparing the paste, 12 parts of the flatting agent and 35 parts of mineral spirits are ground in a ball mill for 16–24 hours, after which 3 parts of butanol are added with thorough stirring. To this paste there is then added with good agitation 50 parts of a 70% non-volatile varnish.

The incorporation of the flatting agents of the present invention into clear or pigmented lacquers parallels the preparation of flat varnishes. For example, a paste which may be further reduced with lacquer after grinding may be prepared by grinding for 24–36 hours in a pebble mill a composition containing 5.7% of dry ½ second nitrocellulose, 3.0% of ethyl alcohol, 5.3% of blown castor oil, 20.0% of butyl acetate, 10.0% of ethyl acetate, 15.0% of butyl alcohol, 31.0% of toluol and 10.0% of the flatting agent. The resulting paste may be let down simply by stirring 18.2% of it with 81.8% of clear lacquer. On the other hand, the flatting agent of the present invention may be incorporated into a lacquer vehicle simply by grinding 2–5% of it with 95–98% of a clear lacquer containing 15–20% of nitrocellulose in a pebble mill for 16–24 hours, followed by a dilution of the composition with sufficient solvent to attain the desired final viscosity.

The flatting agent of this invention is valuable in that it possesses high flatting power and has excellent stability when ground into a paste and when incorporated into a finished varnish or lacquer composition. Varnishes containing the flatting agent show an exceedingly small afterbodying tendency, and can be baked at reasonably high temperatures (e. g., 250° F.) without appreciable after-yellowing due to the presence of the flatting agent.

I claim:

1. A product suitable for use as a flattening agent comprising a metallic salt of a raw, non-pyrolized resin and particles of non-acidic material of the resin in its original raw, insoluble state dispersed throughout said salt, said particles being sufficiently large that films formed from coating compositions containing 15% of said particles based on the total weight of non-volalites of the coating composition will have a relatively "flat" surface, the resin being one from the group consisting of the fossil, semi-fossil and semi-recent Congo resins, and the metal being one from the group consisting of aluminum, magnesium, calcium, strontium, barium, zinc and zirconium.

2. The product of claim 1, in which the metal is aluminum.

3. The product of claim 1, in which the metal is zinc.

4. The method of preparing a product of claim 1 which comprises dispersing a raw, non-polymerized material from the class consisting of fossil, semi-fossil and semi-recent congo resins in a heated aqueous solution of an alkali metal hydroxide, and adding to said dispersion a water-soluble salt of a metal selected from the group consisting of aluminum, magnesium, calcium, strontium, barium, zinc and zirconium.

5. The method of claim 4, in which the water-soluble salt is an aluminum salt.

6. The method of claim 4, in which the water-soluble salt is a zinc salt.

7. A "flat" coating composition consisting essentially of a film-forming liquid of a type commonly employed in varnishes and lacquers and up to about 40% of a compound of claim 1, based upon the total content of non-volatiles of the composition.

8. A "flat" coating composition consisting essentially of a film-forming liquid of a type commonly employed in varnishes and lacquers and up to about 40% of a compound of claim 2, based upon the total content of non-volatiles of the composition.

9. A "flat" coating composition consisting essentially of a film-forming liquid of a type commonly employed in varnishes and lacquers and up to about 40% of a compound of claim 3, based upon the total content of non-volatiles of the composition.

10. The method of preparing the product of claim 1 which comprises dispersing the resin in a state of subdivision such that substantially 100% thereof will pass through a screen having 100 holes per linear inch, in a heated aqueous solution of an alkali-metal hydroxide, and adding to said dispersion a water-soluble salt of aluminum.

11. The method of claim 10 in which the dispersion of the resin in the solution of the alkali-metal hydroxide is effected within a temperature range of from about 50° C. to 80° C.

KENNETH A. EARHART.

REFERENCES CITED

The following references are of record in the file of this patent:

UNITED STATES PATENTS

| Number | Name | Date |
|---|---|---|
| 1,482,919 | Ellis | Feb. 5, 1924 |
| 1,942,413 | Dietz et al. | Jan. 5, 1934 |
| 2,075,025 | Dietz et al. | Mar. 30, 1937 |
| 2,417,071 | Gebhardt et al. | Mar. 11, 1947 |

OTHER REFERENCES

Keto: Archiv. der Pharmazie, vol. 239 (1901), pp. 551, 553, 569, 570 and 571.

Gardner: Ind. & Eng. Chemistry, vol. 25, June 1933, pp. 696–698.

Certificate of Correction

Patent No. 2,541,077                                                         February 20, 1951

KENNETH A. EARHART

It is hereby certified that error appears in the printed specification of the above numbered patent requiring correction as follows:

Column 1, line 27, for the word "casing" read *coating*; column 8, lines 36 and 37, for "non-polymerized" read *non-pyrolized*;

and that the said Letters Patent should be read as corrected above, so that the same may conform to the record of the case in the Patent Office.

Signed and sealed this 1st day of May, A. D. 1951.

[SEAL]

THOMAS F. MURPHY,
*Assistant Commissioner of Patents.*